United States Patent [19]

Makhlouf et al.

[11] Patent Number: 4,812,508
[45] Date of Patent: Mar. 14, 1989

[54] MODIFIED ROSIN SOAPS FOR ACRYLIC EMULSIONS

[75] Inventors: Joseph M. Makhlouf, Mars; Michael M. Chau, Gibsonia; James R. Freid, Pittsburgh, all of Pa.

[73] Assignee: PPG Industries, Inc., Pittsburgh, Pa.

[21] Appl. No.: 764,029

[22] Filed: Aug. 9, 1985

[51] Int. Cl.⁴ ............................................. C08L 93/00
[52] U.S. Cl. ..................................... 524/764; 524/124; 526/213
[58] Field of Search ................. 524/724, 764; 526/213

[56] References Cited

U.S. PATENT DOCUMENTS

| 2,272,057 | 2/1939 | Cheetham | 524/764 |
| 3,591,541 | 7/1971 | Athey et al. | 524/764 |
| 4,239,669 | 12/1980 | Scott et al. | 260/29.6 R |
| 4,388,427 | 6/1983 | Nishikawa et al. | 524/764 |

FOREIGN PATENT DOCUMENTS

| 0050226 | 4/1982 | European Pat. Off. | 524/764 |
| 0059766 | 4/1984 | Japan | 524/764 |

OTHER PUBLICATIONS

Product Data Sheet No. 741-13-Hercules Inc.; Pentalyn ® 255 Synthetic Resin.

Primary Examiner—Joseph L. Schofer
Assistant Examiner—J. M. Reddick
Attorney, Agent, or Firm—Godfried R. Akorli

[57] ABSTRACT

This invention discloses a modified rosin soap which is an ammonia-neutralized esterification product of a Diels-Alder adduct of a monomeric rosin and an alpha, beta-unsaturated carboxylic compound. The use of the modified rosin as an emulsifier and/or a stabilizer in the preparation of an acrylic latex and the use of the acrylic latex in ink formulations are also disclosed.

3 Claims, No Drawings

MODIFIED ROSIN SOAPS FOR ACRYLIC EMULSIONS

BACKGROUND OF THE INVENTION

1. Field of the Invention

This invention relates to acrylic latices and methods of preparing and using the same, particularly in inks.

2. Brief Description of the Prior Art

Latices and the process of making and using the same are known in the art. The method of preparing the latices by free radical emulsion polymerization of unsaturated monomers is also known in the art. The resultant latices which typically are of high molecular weight have good mechanical properties. It has, however, been found that the latices leave something to be desired as to film properties such as humidity resistance, caustic resistance and the like. These shortcomings are, at least in part, due to surfactants which are used in the preparation and stabilization of the latices.

Surfactants are typically low molecular weight materials that are water-soluble. Consequently, coatings or inks containing said surfactants are rendered water-sensitive. This is especially the case when the surfactants are used in high concentrations. Also, surfactants can exude to the surface of coatings or printed inks. In order to overcome some of the associate problems of low molecular weight surfactants, "polymeric surfactants" have been developed.

The present invention provides a novel surfactant which is particularly useful in preparing binders for ink formulations.

SUMMARY OF THE INVENTION

In accordance with the foregoing, the present invention encompasses a modified rosin soap comprising an esterification product of a Diels-Alder adduct of:

(i) a monomeric rosin, and
(ii) an unsaturated carboxylic compound;

the esterification product is at least partically neutralized with ammonia. In a preferred embodiment of the invention, an alpha, beta-unsaturated carboxylic compound such as maleic anhydride is employed; the Diels-Alder adduct thereof (commonly referred to as maleinized rosin) is esterified by reacting the adduct with pentaerythritol. The resultant esterification product is neutralized with ammonia to produce the modified rosin soap.

The invention further encompasses a process for preparing an acrylic latex by free radical polymerization of ethylenically unsaturated monomers in water, in the presence of the instant modified rosin soap which serves as an emulsifier and/or a stabilizer.

Consonantly, the invention encompasses the acrylic latices prepared by the above process, and compositions containing the same. Ink formulations containing said acrylic latices have been found to be stable and possess good performance properties. The performance properties are manifest particularly in printing, on porous substrates such as styrofoams. Printed matter of these ink formulations have excellent gloss, caustic resistance (to pasteurization solutions and/or line lubricant compositions) and other desirable properties.

In this context, the term "modified rosin" denotes rosins which are modified, in the main, by treatment to modify their ring structure, as opposed to their carboxyl functinal group. Reaction through the carboxyl functional group is not hereby excluded.

DETAILED DESCRIPTION OF THE INVENTION

The monomeric rosins useful herein are generally resinous materials obtained from oleoresins or stump wood of pine trees. They contain monoacid compounds (hereinafter referred to as rosin monoacid) which are carboxyl functional. An illustrative example of the rosin acids is an abeitic or a pimaric acid and/or isomers thereof. Also present are smaller amounts of non-acid compounds.

The alpha, beta-unsaturated carboxylic compounds useful herein include alpha, beta-ethylenically unsaturated dicarboxylic acids or anhydrides thereof. Illustrative examples thereof are maleic acid, fumaric acid, itaconic acid, maleic anhydride and itaconic anhydride.

A Diels-Alder adduct can be prepared by mixing the monomeric rosin and the alpha, beta-unsaturated carboxylic compound in an equivalent ratio of about 2 to 1:1. The above reaction can be conducted typically over a temperature range of 100° to 180° C.

Esterification products of the Diels-Alder adduct can be prepared as follows. The adduct is reacted with polyols containing from about 2 to 8 and preferably 4 hydroxyl functional groups. In a preferred embodiment, the Diels-Alder adduct is reacted with pentaerythritol. Other examples of the useful polyols are neopentyl glycol, trimethylolpropane, sucrose or dipentaerythritol.

Alternate methods of preparing the modified rosin soap of the invention are also encompassed by the present invention. For example, the carboxylic compound may be esterified before it is subjected to a Diels-Alder reaction with the monomeric rosin. The reaction product can be neutralized to form the modified rosin soap. The neutralization can be conducted directly or in situ by reaction of the esterification product with ammonia. It is believed that certain amines can be used instead of ammonia.

In the practice of this invention, the modified rosin soap can be employed in a process for preparing an acrylic latex by free radical copolymerization of an ethylenically unsaturated monomer in an aqueous medium containing an emulsifier and/or stabilizer which is the modified rosin soap. In this process, the modified rosin soap can have an acid number of 150 to 300. It can be employed in amounts of 15 to 40 percent and preferably 20 to 30 percent based on total weight of the solids.

In the copolymerization, ethylenically unsaturated monomers such as vinyl monomers, e.g., styrene, vinyl acetate, vinyl toluene, ethylenically unsaturated acids such as acrylic acid, methacrylic acid and the like, esters of ethylenically unsaturated acids such as ethyl acrylate, 2-ethylhexyl acrylate, butyl acrylate, methyl methacrylate, N-methylolacrylamide and the like such as monomers containing crosslinkable functional groups may be used.

The resultant acrylic latices have a solids content of 10 to 65 and preferably 35 to 45 percent, and particle size of 1000 to 4000 Angstroms and preferably 1000 to 2000 Angstroms. It is of note that in preparing the acrylic latices with desirable particle size of about 1000 to 2200 Angstroms, the modified rosin soaps can be employed in comparatively lower but effective amounts, in contrast with art-known polymeric acrylic soaps. It is also noted that unlike art-related acrylic polymeric soaps, the modified rosin soaps of this invention can be free or substantially free of organic solvents such as alcohols which can have associate negatives as described hereinafter.

In formulating ink compositions of this invention, from about 15 to 35 and preferably 24 to 30 percent by weight resin solids of the acrylic latex is employed therein. The ink composition can contain other resins, pigments and additives such as foam control agents, wetting agents, thickeners, and the like.

In the practice of the invention, the ink formulations have been found to have good rewetting properties of photopolymer printing plates. Moreover, the ink formulations of this invention do not attack the photopolymer printing plates. The ink formulations have been found to be suitable in providing printed matter of excellent qualities particularly on porous substrates. Printed ink from the compositions of this invention whether heat shrunk or not have excellent caustic resistance. As such, the printed matter has been found to be particularly useful for labelling beverage containers which are exposed to caustic lubricant compositions and pasteurization solutions.

The invention will be further described in the following nonlimiting examples.

EXAMPLE 1

This example relates to an ammonium salt of maleinized rosin ester and its use in preparing an acrylic latex for use in ink formulations.

| Ingredients | Parts by Weight (grams) |
|---|---|
| Charge I | |
| PENTALYN 255[1] | 303.75 |
| Deionized water | 1500 |
| Ammonia (28% aqueous) | 69.3 |
| Charge II | |
| Ammonium persulfate | 7.95 |
| Deionized water | 19.5 |
| Charge III | |
| Methyl methacrylate | 359 |
| 2-Ethylhexyl acrylate | 299.1 |
| Styrene | 538.4 |

[1] A maleinized ester of rosin having an acid value of about 196, available from Hercules Inc.

Charge I was heated in a reaction vessel equipped with a stirrer, condenser, thermometer and nitrogen blanket to a temperature of 80° C. and held thereat until the PENTALYN 255 dissolved completely, in about 2 hours. Charge II was added and immediately thereafter the addition of Charge III was commenced and carried out over a period of 2 hours at a temperature of 80° C. The resultant mixture was held for another 2 hours at 80° C., cooled, discharged and analyzed with the following results. Determined solids content measured at 150° C. for 2 hours was 46.5 percent, particle size was 2173 Angstroms and pH was 9.15.

An ink formulation was prepared with the above acrylic latex and the following listed ingredients.

| Ingredients | Parts by Weight (grams) |
|---|---|
| The above acrylic latex[1] | 58.0 |
| Deionized water | 10.0 |
| FOAMBURST 370 | 0.5 |

| Ingredients | Parts by Weight (grams) |
|---|---|
| Blue pigment | 21.0 |

[1] The above acrylic latex was used in the form of a blend of 95 parts by weight (grams) of the acrylic latex as prepared above which was blended under agitation with 5 parts by weight (grams) of N—methylpyrrolidone.

The above ingredients were ground well for about 15 minutes and then let down by adding thereto a mixture of 0.5 parts by weight of FOAMBURST 370 and 10 parts by weight water. The resultant ink formulation had a viscosity of 19 seconds as measured with a number 2 Zahn cup.

With flexohand proofer, the ink formulation was applied to an unshrunk styrofoam substrate by a rollout method. A clear (non-pigmented) glossy coating was applied over the dried ink by the same method as the ink. The dried ink was subjected to a lubricant resistance test with LUJOB (1 percent aqueous solution of a lubricant available from Diversey Wyandotte Corporation) at 100 cycles on a Sutherland rub tester. The ink formulation showed good lubricant resistance.

EXAMPLE 2

This example relates to an ammonium salt of maleic anhydride-modified rosin ester and its use in preparing an acrylic latex.

| Ingredients | Parts by Weight (grams) |
|---|---|
| Charge I | |
| PENTALYN 255 | 405 |
| Deionized water | 2100 |
| Ammonia (30% aqueous) | 88.5 |
| Charge II | |
| Ammonium persulfate | 7.95 |
| Deionized water | 58.5 |
| Charge III | |
| Methyl methacrylate | 329 |
| 2-Ethylhexyl acrylate | 274 |
| Styrene | 494.8 |
| Charge IV | |
| Hydrogen peroxide | 3.7 |
| Charge V | |
| Isoascorbic acid | 1.1 |
| Deionized water | 13 |

Charge I was heated in a properly equipped reaction vessel to a temperture of 80° C. and held thereat until the PENTALYN 255 dissolved completely. Charge II was added and immediately thereafter the addition of Charge III was commenced and carried out over a period of 2 hours at a temperature of 80° C. The resultant mixture was held for another 2 hours at 80° C. Charge IV was then added, followed by the addition of Charge V over a period of 15 to 30 minutes. Upon completion of the addition, the reaction product was held at 80° C. for one hour, cooled, discharged and analyzed. The pH was 8.55.

EXAMPLE 3

This example also illustrates the ammonium salt of maleic anhydride-modified rosin ester and the methods of using the same in ink formulations.

| Ingredients | Parts by Weight (grams) |
|---|---|
| Charge I | |
| PENTALYN 255 | 303.8 |

-continued

| Ingredients | Parts by Weight (grams) |
| --- | --- |
| Deionized water | 1530 |
| Ammonia (30% aqueous) | 85.3 |
| Charge II | |
| Ammonium persulfate | 7.95 |
| Deionized water | 19.5 |
| Charge III | |
| Methyl methacrylate | 418.8 |
| 2-Ethylhexyl acrylate | 239.3 |
| Styrene | 538.4 |

The above was used in preparing an acrylic latex polymer in essentially the same manner as described in Example 1. The resultant polymer had a solids content of 39.1 (at 150° C. after 1 hour) and milliequivalents of acid of 0.301.

An ink formulatin was prepared with the above acrylic latex and the following listed ingredients.

| Ingredients | Parts by Weight (grams) |
| --- | --- |
| The above acrylic latex | 63 |
| N—methyl pyrrolidone | 3.0 |
| Deionized water | 7.0 |
| FOAMBURST 370 | 1.0 |
| Blue pigment | 21.0 |

The ink was formulated to hve a viscosity of 21 seconds measured with a number 2 Zahn cup in essentially the same manner as described in Example 1. The ink was applied to a styrofoam substrate with a flexohand proofer by a rollout method. A clear (non-pigmented) coating was then applied to the dried ink by the same method as the ink. The printed ink had good lubricant resistance (to LUJOB) at 100 cycles and good pasteurization resistance after a 10-minute soak at 140° F. (60° C.) in a pasteurizer comprising PASTEURITE (0.2 percent aqueous solution) which is a caustic solution available from Diversey Wyandotte Corporation.

While the illustrative embodiments of the invention have been described hereinabove with particularity, it will be understood that various modifications will be apparent to and can be readily made by those skilled in the art without departing from the scope or spirit of the invention. Accordingly, it is intended that claims directed to the invention be construed as encompassing all aspects of the invention which would be treated as equivalents by those skilled in the art to which the invention pertains.

Therefore what is claimed is:

1. A process for preparing an acrylic latex comprising polymerizing an ethylenically unsaturated monomer in an aqueous medium containing an emulsifier which is a modified rosin soap comprising an esterification product of a Diels-Alder adduct of:
   (I) a monomeric rosin and
   (II) an alpha, beta - ethylenically unsaturated dicarboxylic acid or anhydride thereof; the esterified product is at least partially neutralized with an amine or ammonia.

2. An acrylic latex which is prepared by the process of claim 1.

3. An ink formulation comprising an acrylic latex of claim 2.

* * * * *